United States Patent [19]

Kamakura

[11] 4,186,992
[45] Feb. 5, 1980

[54] BINOCULAR WITH AN ARRANGEMENT FOR ADJUSTING THE DISTANCE BETWEEN TWO TELESCOPES

[76] Inventor: Ichiro Kamakura, c/o Kamakura Kohki Kabushiki Kaisha, No. 6-12, Tsukagoshi 3-Chome, Warabi-shi, Saitama-Ken, Japan

[21] Appl. No.: 927,523

[22] Filed: Jul. 24, 1978

[51] Int. Cl.² .............................................. G02B 7/06
[52] U.S. Cl. ......................................... 350/36; 350/76
[58] Field of Search .................................... 350/74–77, 350/36

[56] References Cited

FOREIGN PATENT DOCUMENTS 2717575  12/1977  Fed. Rep. of Germany ............. 350/75

Primary Examiner—Jon W. Henry
Attorney, Agent, or Firm—Michael J. Striker

[57] ABSTRACT

This invention relates to a binocular in which a focus adjusting ring is built in a central body of the binocular so that it cannot be collided with something rigid. The binocular central body having the built-in focus adjusting ring is rotatably linked with a pair of telescopes by a plurality of screw-type pins.

2 Claims, 4 Drawing Figures

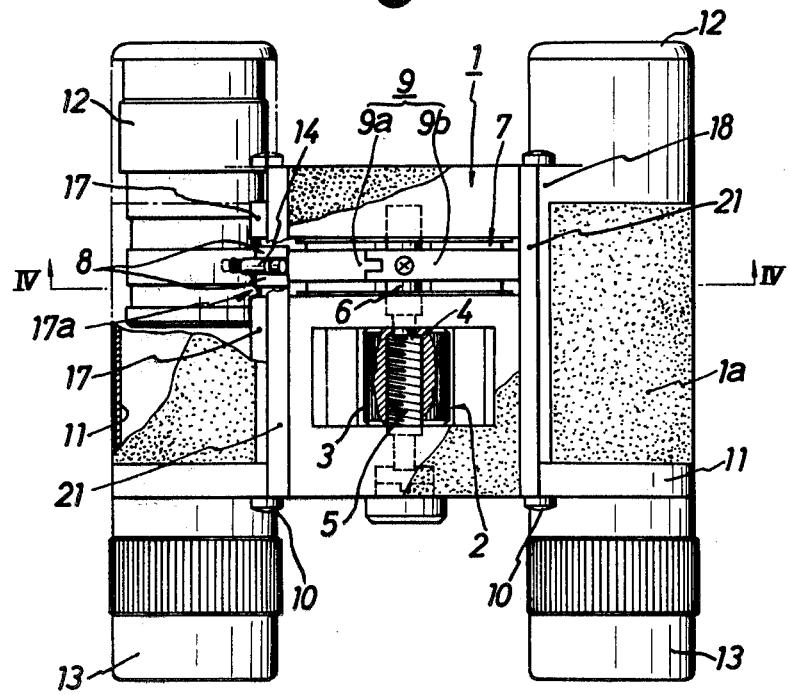
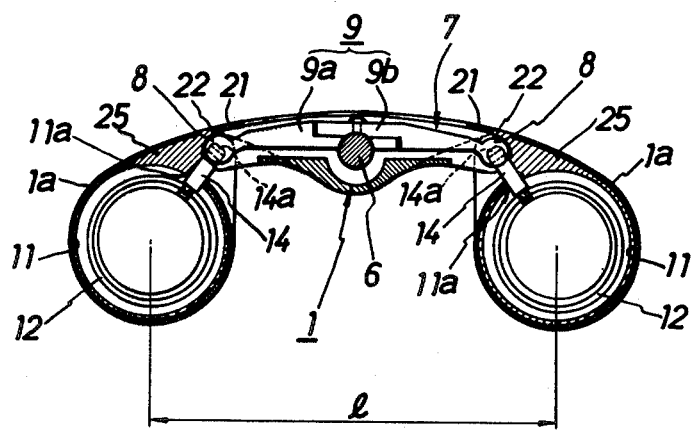

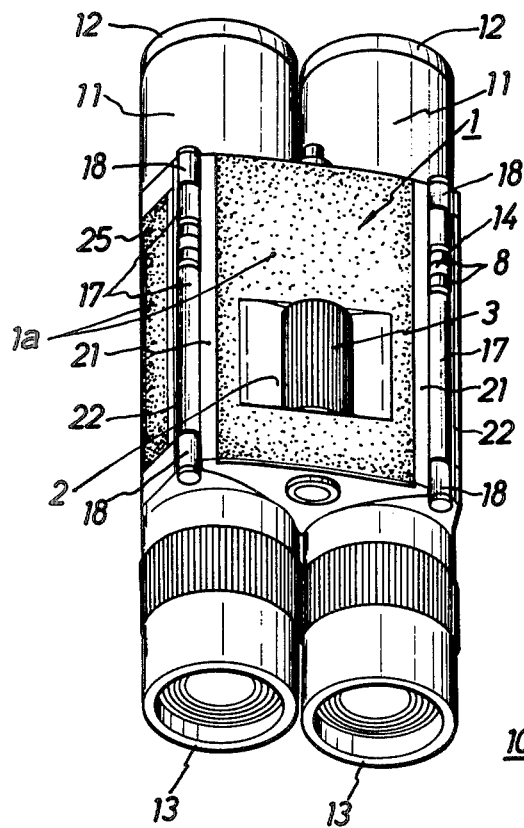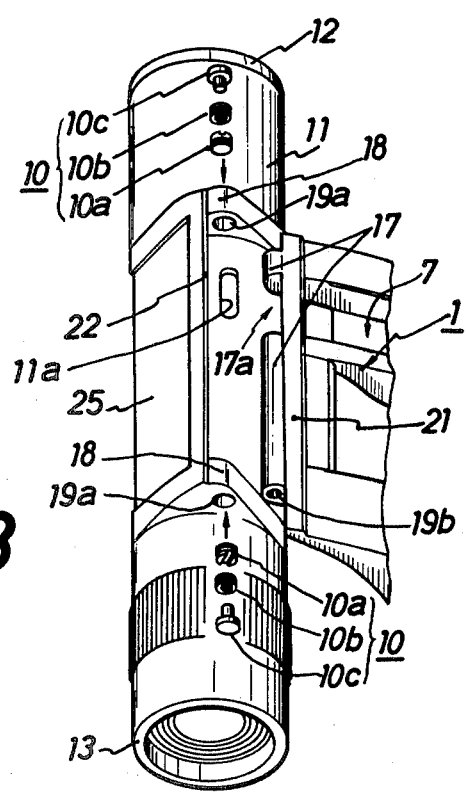

BINOCULAR WITH AN ARRANGEMENT FOR ADJUSTING THE DISTANCE BETWEEN TWO TELESCOPES

BACKGROUND OF THE INVENTION

This invention relates to a binocular in which a focus adjusting ring is built in the binocular body, and more particularly a binocular in which two sides of the binocular body having the built-in focus adjusting ring are rotatably linked with a pair of telescopes by a plurality of screw-type pins.

A binocular has a focus adjusting means for moving an objective lens unit, the focus adjusting means being normally exposed or projected as a ring or a lever outwardly of the binocular body. Because of an outward projection of the focus adjusting means from the binocular body, when carring such a binocular there is growing the danger that it may be collided with something rigid, and thereby damaged or deformed. This is a serious defect in view of maintaining accuracy of the binocular.

Further, according to a conventional binocular, two telescopes are normally rotated in a considerably wider range. Accordingly, when using such a conventional binocular, a viewer's interpuppillary spacing adjustment is rather cumbersome, and there occurs frequently the possibility that a viewer may lose the optimum chance to catch an object to be viewed by the binocular.

The above two defects have been overcome by having developed a novelty binocular in which a focus adjusting means is built in a binocular body of which two sides are rotatably linked with a pair of telescopes by a plurality of screw-type pins.

BRIEF SUMMARY OF THE INVENTION

It is therefore an object of this invention to provide a binocular in which a focus adjusting ring is built in an opening recess of a binocular central body of which both sides are rotatably linked with a pair of telescopes by a plurality of screw-type pins, thereby the built-in focus adjusting ring in the binocular central body being able to be protected from collision.

It is another object of this invention to provide a binocular in which an interpuppillary spacing adjustment is able to be obtained easily within a certain defined range so that a pair of telescopes cannot be opened so largely.

It is another object of this invention to provide a binocular in which linkage of the binocular central body with a pair of telescopes has a strong mechanical structure, thereby the binocular being able to cope with a certain strong impact.

Other and further objects, features and advantages of the invention will appear more fully from the following description.

BRIEF DESCRIPTION OF THE DRAWINGS

FIG. 1 is a partially cutaway plan view of a binocular according to this invention.

FIG. 2 is a perspective view of the folded condition of the binocular in FIG. 1.

FIG. 3 is an exploded perspective view showing a main part of the binocular in FIG. 1.

FIG. 4 is a section view taken on lines IV—IV of FIG. 1.

DETAILED DESCRIPTION OF THE INVENTION

Referring first to FIG. 1, a binocular central body 1 of metal-made structure of triangular shape in section is provided with an opening recess 2 in which is disposed a focus adjusting ring 3. The top surface of the body 1 is slightly curved as shown in FIG. 4. Numeral 1a is a decorative panel. In the opening recess 2 there is disposed a sliding pin 6 which is inserted into a guiding hole 4 for guiding the sliding pin 6. The sliding pin 6 has an external thread 5 engaged with the focus adjusting ring 3, whereby it is slidable back and forth by rotating the focus adjusting ring 3.

Further, in parallel with the opening recess 2 there is disposed a channel 7 for incorporating a bar 9 therein. The detailed structure of the bar 9 is shown in FIG. 1 and FIG. 4. The bar 9 is fixed with the sliding pin 6 by a screw with a right angle in relation to the sliding pin 6. Each of two ends of the bar 9 has a bifurcate fitting member 8. Under the above structure, the bar 9 is movable back and forth by rotating the focus adjusting ring 3. Further, the bar 9 consists of a leftside bar member 9a and a rightside bar member 9b, both of which are fixed with each other on the center of the sliding pin 6. Both sides of the body 1 are fixed with a pair of telescopes 11 by a plurality of screw-type pins 10 which will be described hereinafter in detail. In each of the telescopes 11 there are incorporated a slidable objective lens housing 12 at one end of the telescope 11 and a slidable ocular lens housing 13 at another end thereof. And a prism sheet (not illustrated) is installed in the ocular lens housing 13 in order to change direction of an optical axis of the lens.

A feed pin 14 is fixed with the objective lens housing 12 which is incorporated in each telescope 11. An end 14a of the feed pin 14 is freely fitted with the bifurcate fitting member 8 of the bar 9, and is movable back and forth within a lengthy hole 11a of each telescope 11. Accordingly, when rotating the focus adjusting ring 3, the sliding pin 6 engaged therewith and the bar 9 engaged with the sliding pin 6 are moved back and forth. As a result, since the feed pin 14 fixed with the objective lens housing 12 is fitted with the bifurcate fitting member 8 of the bar 9 to be moved back and forth, the objective lens housing 12 is moved back and forth.

In this case, the channel 7 and a cutaway portion 17a are of the approximately same width, and are communicated with each other. Further, the width of the channel 7 and of the cutaway portion 17a is wider than that of the bar 9, so that the bar 9 is freely movable within the channel 7 and the cutaway portion 17a.

Even if a pair of telescopes 11 are folded as shown in a phantom line of FIG. 1, the feed pin 14 can be rotated at the portion of the bifurcate fitting member 8, so that any viewer can adjust a focus distance by rotating the focus adjusting ring 3. In this embodiment the feed pin 14 is fixed with the objective lens mounting housing 12 slidable within the telescope 11, but it may be fixed with the ocular lens mounting housing 13.

The decorative panel 12 is covered on the body 1 excepting a surface of the focus adjusting ring 3. This is to enhance a beautiful sight of the binocular as well as to protect the body 3 against dusts or the like.

The structure and function of the screw-type pin 10 will be described hereinafter. As shown obviously in FIGS. 2 and 3, the body 1 has a screw-type pin receiving portion 17 of steamline shape, while the telescope 11 has two screw-type pin receiving portions 18 of triangular shape.

The screw-type pin receiving portions 17, 18 are rotatably linked with each other by a plurality of screw-type pins 10 each comprising a screw 10a, a stop screw 10b and a decorative screw 10c. A set of screw-type pin 10 having the above members 10a, 10b, 10c is inserted into a thread hole 19a, and an end of the screw 10a is seated in a hole 19b of the screw-type pin receiving portions 19b of the central body 1. Then, a pair of telescopes 11 are rotatably linked with the body 1. The stop screw 10b and the decorative screw 10c are mounted in the thread hole 19a so that the screw 10a cannot be loosened.

Further, the screw-type pin receiving portion 17 of the central body 1 is provided with a longitudinal stopping portion 21, while the screw-type pin receiving portion 18 of the telescope 11 is provided with a longitudinal stopping portion 22 which is disposed on the top of a sloped surface 25 of the telescope 11. The longitudinal stopping portions 21 and 22 are firmly contacted with each other. By means of the above stopping portions 21, 22 and the corresponding screw-type pin receiving portions 17, 18, a pair of telescopes 11 are rotatable within a defined range.

In the binocular according to this invention, the range of rotation l of a pair of telescopes 11 is from 60 mm at minimum to 72 mm at maximum. That is, a pair of telescopes 11 are not rotatable more than 72 mm. As shown in FIG. 4, in the maximum opened condition of a pair of telescopes 11, the sloped surface of the telescopes 11 and the slightly curved upper surface of the body 1 are adjoined with each other so that a moderately curved bigger surface is obtained as shown in FIG. 4. On the other hand, when a pair of telescopes 11 have been folded, as shown in FIG. 2 the binocular body 1 of approximately triangular shape in section is compactly incorporated in the recess formed between the two telescopes 11.

As described above, since a focus adjusting ring is built in the binocular body, in other words, it is not projected outwardly of the binocular body 1, the danger that it may be collided with something rigid is removed. Thus, the focus adjusting ring is always safely protected in the binocular body, thereby its damage or deformation being avoidable largely.

Further, by disposing a longitudinal stopping portion at the screw-type pin receiving portions of the binocular body as well as another longitudinal stopping portion at the screw-type pin receiving portions of the telescope, a pair of telescopes can be rotated within a defined range. Accordingly, when a viewer opens a space between the two telescopes to the maximum range 72 mm, it is quite easy to define the range l of the telescopes to a normal eye-to-eye length 64 mm to 65 mm of the viewer. Due to a slight rotation of the telescopes, the viewer can catch speedily an object to be viewed.

It is further understood by those skilled in the art that the foregoing description is a preferred embodiment of the disclosed device and that various changes and modifications may be made in the invention without departing from the spirit and scope thereof.

What is claimed is:

1. A binocular, comprising first and second telescopes each including an ocular lens housing and an objective lens housing; a central body positioned between the first and second telescopes and having a channel; a focus adjusting ring built in the central body, said telescopes and central body being rotatably linked with each other by a plurality of screw-type pins each engaging screw-type pin receiving portions disposed on both sides of the central body as well as adjacent each end of each telescope, the built-in focus adjusting ring including a sliding pin engaged therewith, the sliding pin being fixed with a bar accommodated is said channel of the central body and including two opposite ends both having respective bifurcate fitting members, said bar having a width smaller than that of said channel, each of the bifurcate fitting members being freely fitted with a feed pin fixed with the objective lens housing, whereby by rotating the built-in focus adjusting ring, the sliding pin and the bar are moved back and forth so that consequently the objective lens housing fixed with the feed pin is moved back and forth.

2. A binocular, comprising first and second telescopes each including an ocular lens housing and an objective lens housing; a central body positioned between the two telescopes, a focus adjusting ring built in the central body, said telescopes and central body being rotatably linked with each other by a plurality of screw-type pins each engaging screw-type pin receiving portions disposed on both sides of the central body as well as adjacent each end of each telescope, said screw-type pin receiving portions of the central body and each telescope being provided with a longitudinal stop portion whereby said telescopes are rotatable within a defined range so that they are not be opened so largely, the built-in focus adjusting ring including a sliding pin engaged therewith, said sliding pin being fixed with a bar having two opposite ends both having bifurcate fitting members freely fitted with a feed pin fixed with the objective lens housing, whereby by rotating the built-in focus adjusting ring, the sliding pin and the bar are moved back and forth so that consequently the objective lens housing fixed with the feed pin is moved back and forth.

* * * * *